(12) United States Patent
Knott et al.

(10) Patent No.: US 6,697,460 B2
(45) Date of Patent: Feb. 24, 2004

(54) ADAPTIVE VOICE RECOGNITION MENU METHOD AND SYSTEM

(75) Inventors: Benjamin A. Knott, Round Rock, TX (US); Robert R. Bushey, Cedar Park, TX (US); John M. Martin, Austin, TX (US); Kurt M. Joseph, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 113 days.

(21) Appl. No.: 10/135,143

(22) Filed: Apr. 30, 2002

(65) Prior Publication Data

US 2003/0202640 A1 Oct. 30, 2003

(51) Int. Cl.[7] .................................................. H04M 1/64
(52) U.S. Cl. .............................. 379/88.22; 379/88.01; 379/88.24; 379/917
(58) Field of Search ............................ 379/67.1, 88.01, 379/88.04, 88.05, 88.06, 88.11, 88.14, 88.16, 88.19, 88.22, 88.23, 88.24, 201.01, 201.03, 917; 704/270, 275

(56) References Cited

U.S. PATENT DOCUMENTS

| | | | | | |
|---|---|---|---|---|---|
| 5,396,536 A | * | 3/1995 | Yudkowsky | .................. | 379/52 |
| 5,493,606 A | * | 2/1996 | Osder et al. | ............... | 379/88.05 |
| 5,509,060 A | * | 4/1996 | Hall et al. | ............... | 379/207.02 |
| 5,553,121 A | * | 9/1996 | Martin et al. | ............ | 379/88.01 |
| 5,703,935 A | * | 12/1997 | Raissyan et al. | ......... | 379/88.18 |
| 5,737,393 A | * | 4/1998 | Wolf | ........................ | 379/88.13 |
| 5,802,526 A | * | 9/1998 | Fawcett et al. | ........... | 707/104.1 |
| 5,818,908 A | * | 10/1998 | Kaplan | ..................... | 379/88.21 |
| 5,870,456 A | | 2/1999 | Rogers | ..................... | 379/91.01 |
| 5,878,117 A | | 3/1999 | Minakami et al. | ........ | 379/88.01 |
| 5,899,972 A | | 5/1999 | Miyazawa et al. | .......... | 704/249 |
| 5,933,484 A | * | 8/1999 | Partridge, III | ......... | 379/201.01 |
| 6,091,805 A | * | 7/2000 | Watson | ..................... | 379/93.17 |
| 6,104,790 A | * | 8/2000 | Narayanaswami | ........ | 379/93.25 |
| 6,178,404 B1 | * | 1/2001 | Hambleton et al. | .......... | 704/275 |
| 6,246,989 B1 | * | 6/2001 | Polcyn | ........................ | 704/275 |
| 6,314,164 B1 | * | 11/2001 | Johnson | ..................... | 379/67.1 |
| 6,314,167 B1 | * | 11/2001 | Johnson | .................... | 379/88.22 |
| 6,314,492 B1 | * | 11/2001 | Allen et al. | .................. | 711/135 |
| 2003/0179865 A1 | * | 9/2003 | Stillman et al. | .......... | 379/88.18 |

* cited by examiner

*Primary Examiner*—Scott L. Weaver
(74) *Attorney, Agent, or Firm*—Baker Botts L.L.P.

(57) ABSTRACT

A method and system for automated speech-enabled responses to caller requests for information prompts caller requests for information from a menu that lists options based upon the frequency of requests for information and for automated collection and updating of content based upon the feedback provided by customers. For instance, a task analyzer classifies information requested by caller opening statements with the classifications based on the task the caller intends to accomplish. For a menu that provides information on telephone services, classifications may include instructions on how to use a service, pre-purchase information, identification of the services that the caller subscribes to, the cost of services, post-purchase information and identification of the caller's long distance carrier.

21 Claims, 7 Drawing Sheets

ADAPTIVE VOICE RECOGNITION MENU METHOD AND SYSTEM

TECHNICAL FIELD OF THE INVENTION

The present invention relates in general to the field of menus and content for automated responses to callers, and more particularly relates to a method and system for adapting voice recognition and touch-tone menus based on the frequency of caller requests for information and for adapting a voice recognition and touch-tone content for information retrieval systems.

BACKGROUND OF THE INVENTION

Telephone call centers handle millions of calls from consumers each year. One significant expense for call centers is the expense of training and maintaining operators to answer inbound calls and interact with callers to help callers complete their objectives. To manage and reduce costs, call centers typically rely on automated responses to caller inquiries so that fewer operators are needed for a given volume of inbound calls. For instance, inbound calls to a call center are answered by interactive voice response units that provide information to callers without operator intervention by interacting with callers through a DTMF tone-based menu. If callers are able to complete their objectives by interacting with automated systems, calling centers typically enjoy substantial cost savings.

One difficulty with the use of automated responses to caller inquiries is that the nature of caller inquiries to a calling center may vary substantially. Thus, automated menus tend to present a broad range of options for callers to select from. However, the greater the variety of possible caller objectives, the more complex the automated menu tends to grow. Complex menu options tend to discourage callers from pursuing their initial objectives due to the length of time typically needed to navigate through the menus. Often, callers end up with their objective unmet, giving up on the automated system in favor of waiting for an operator. Thus, complex navigation menus may fail in reducing operator workload while producing dissatisfied customers.

One solution that simplifies caller interaction with automated interactive voice response units is the ability to apply voice recognition for determining caller inputs. Voice recognition allows callers to state a query which is analyzed to determine the desired information. Voice recognition enabled interactive response units are typically simpler to use than DTMF tone based systems since a caller is able to simply state a request without having to select from a defined list of menu items. However, voice recognition accuracy suffers when the glossary of terms to be recognized becomes large or when communication of voice utterances is unclear, such as with a bad telephone connection or an unclear speaker. Failure of voice recognition often leads to frustrated callers who are unable to obtain desired objectives or to even navigate through menus that require voice recognition.

Another difficulty with the use of automated responses to caller inquiries is that the content of the information provided to the caller is rarely updated and tailored to the callers needs over time. The content of the information provided has a high degree of validity and applicability on the day of implementation. However, over time, the callers needs, the technology, and other related systems change, thus establishing the requirement to update this content. Out-of-date content will discourage callers from using the automated systems. Thus, the automated systems will fail to reduce operator workload while producing dissatisfied customers.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION OF THE INVENTION

A speech-recognition enabled, interactive voice response system presents an adaptable menu to callers to obtain information over a telephone with speech or touch-tone DTMF inputs. The customer-centric menu arranges nodes based on call frequency for classifications of information. The frequency of requests for information based on the classification of the information adapts menu options to be presented in an order that relates to the likelihood of a request for information by a caller, thus providing a more rapid location of desired information. Analysis of opening statements made by callers identifies tasks of callers upon initial contact and relates the tasks to information classifications. The adaptable menu nodes allow callers to navigate quickly to desired information by applying voice recognition to caller inputs responsive to an initial prompt for the caller's task. Menu nodes list menu options based on the frequency of requests for classifications of information and include DTMF touch-tone input options for each information classification. In one embodiment, a menu adapted to provide frequently requested information on telephone services provides a reduction in the navigation time of callers and a reduction in caller reliance on operators.

An automated system presents adaptable content to callers to obtain current and appropriate information. Customer-centric content is updated based on frequency of customer feedback. The frequency of customer feedback provides a basis for updating the content, thus providing more current and usable information. The adaptable content allows callers to retrieve current and usable information by automatically updating the content based on customer feedback. This updated content is the sequence of information and the content itself.

Figure 1:
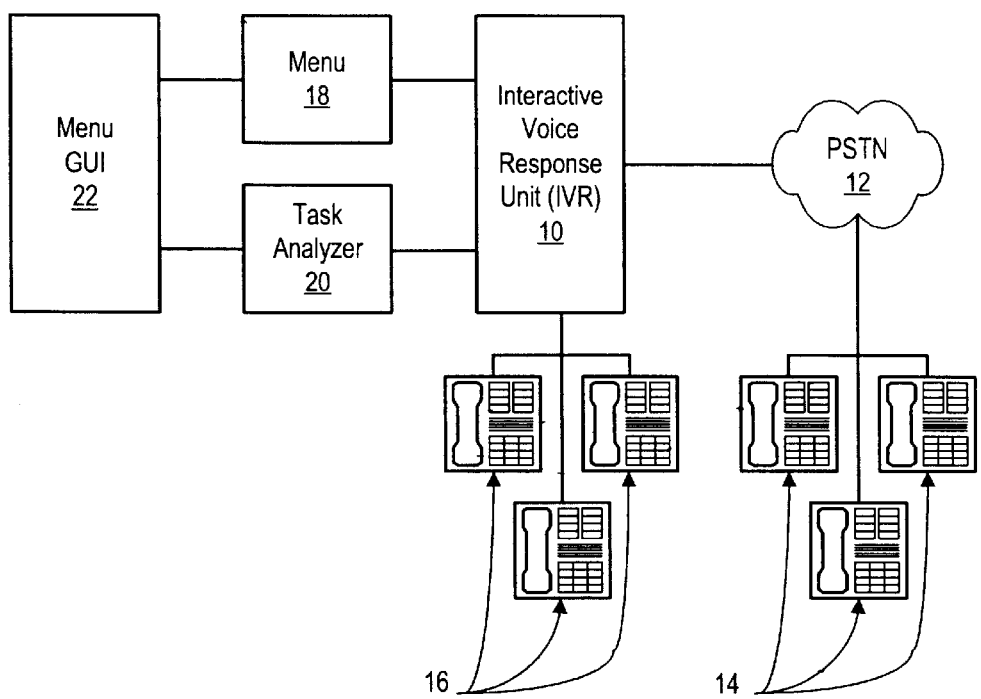
FIG. 1 depicts a block diagram of a system for presenting voice prompt menu options based on the frequency of caller requests for information.

Referring to FIG. 1, a block diagram depicts a system for analyzing call request topics and setting a call menu for improved automated response in accomplishing caller tasks. An interactive voice response unit (IVR) 10 provides speech and touch-tone enabled interactive voice responses that allow callers interfaced through a communication network 12 and telephones 14 to obtain information. The embodiment depicted by FIG. 1 uses telephone communication through the Public Switched Telephone Network (PSTN), although alternative embodiments include mobile or computer telephony devices communicated through the Internet or other suitable networks. If a caller is unable to receive information from the automated responses of IVR 10, then the caller is forwarded to an operator 16 interfaced with IVR 10 for individual handling.

Callers establish communication with IVR 10 by, for instance, placing a telephone call with telephones 14 through PSTN 12 to a predetermined telephone number associated with IVR 10. As one example, callers request information about their telephone service by dialing a number provided on their bill or advertised on their telephone book. IVR 10 provides a voice menu that directs callers to input information requests through either a voice response or a touch-tone response. A menu 18 interfaces with IVR 10 to provide callers with menu nodes that guide callers to accomplish specific desired tasks. Menu 18 has a data-driven design with dual speech and touch-tone input options. Menu options are presented to aid callers in completing specific tasks with the order and selection of menu option presentation based on an analysis of the frequency of caller requests for specific tasks. A task analyzer 20 interfaces with IVR 10 to analyze the frequency of requested caller tasks from caller requests to IVR 10. A menu graphical user interface (GUI) 22 provides access to the task analysis and interfaces with menu 18 to arrange menu nodes according to the analysis of the frequency of task requests, thus allowing users to more efficiently accomplish desired tasks.

In one embodiment, menu 18 provides an automated service that provides callers with information about current telephone services, product or service availability and pricing, and operating instructions for how to use services. Menu 18 presents voice responses to callers to request input of and to address the specific caller task, such as the specific service and associated information requested by the caller, based upon the analysis of the frequency of requests for the specific task. By ordering menu options to address tasks by their requested frequency, menu 18 expedites the identification of caller tasks and helps ensure accurate and timely transfer of requested information, thus reducing the likelihood that a caller will request or need operator intervention. Task analyzer 20 identifies requested information by frequency and provides the task frequency to menu GUI 22 for organizing menu 18. In one alternative embodiment, task analyzer 20 automatically updates menu content and order based on frequency analysis, either on a periodic basis or when significant frequency changes are noted. Task analyzer 20 automatically implements menu updates and identifies the updates to system administration through menu GUI 22.

In one specific example, task analyzer 20 analyzed the "opening statements" of callers to determine the caller's intention, i.e., the task that the caller sought to complete in the call, and arranged menu 18 to respond to caller requests according to task frequency. Analysis of 3000 opening statements identified 15.6% of calls as requests for information about telephone products and services that are efficiently handled by automated responses. For instance, the opening statement may be a caller utterance to an operator or a speech-enabled IVR main menu request in which the user states the purpose of the call. These requests for information are classified into six high-level user task categories:

| 1 | "What is" or "How to use" a feature or | 33% |
|---|---|---|
| 2 | Pre-purchase information. | 18% |
| 3 | "What service do I have? " or "Do I have a service?" | 14% |
| 4 | "How much does a service cost?" | 13% |
| 5 | Post-purchase information. | 10% |
| 6 | "Who is my Long Distance provider?" | 6% |
| 7 | Other | 6% |

The most frequent request for information is for instructions describing how to use a telephone service, such as Caller ID, call blocking or call forwarding. Next in frequency are requests for information about services available for purchase, such as Internet DSL service, new phone service or wireless phone service. Third in frequency are requests for information about the services that the caller already has. Fourth in frequency are requests for the cost of services, such as adding a second telephone line or Caller ID. Fifth in frequency are requests for post-purchase information, such as changing or updating a service. Sixth in frequency are requests for identification of the caller's long distance carrier.

Figure 2:
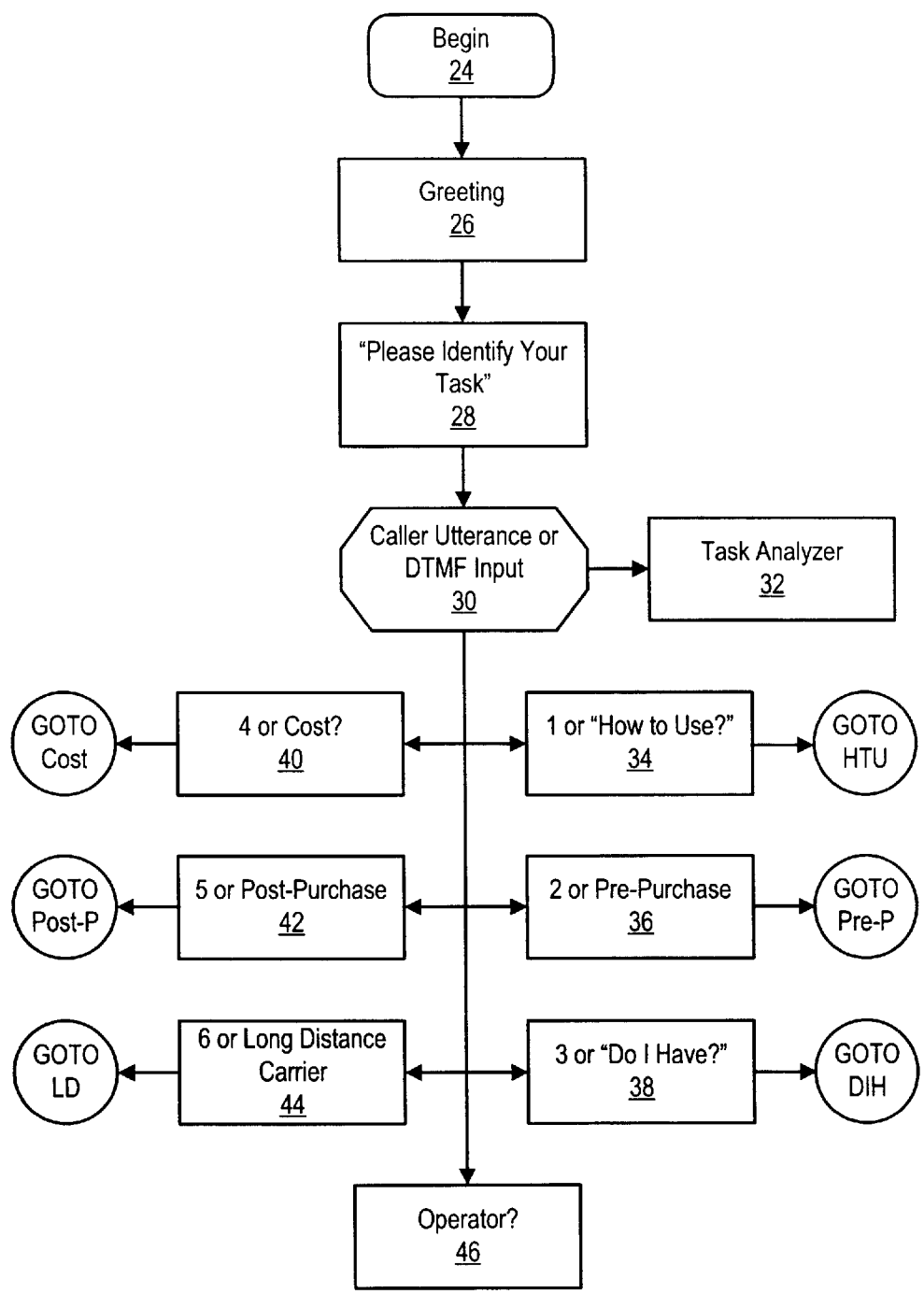
FIG. 2 depicts a flow diagram of an opening menu for providing frequently requested information on telephone services.

Based upon this frequency analysis, menu 18 provides six primary functions associated with the identified caller tasks so that caller requests for information are more rapidly identified and addressed. Referring now to FIG. 2, a flow diagram depicts the initial menu node presented to a caller to provide information for the six frequent tasks identified by the task analyzer. The process begins at step 24, for instance, with the calling of a predetermined phone number by a customer to establish communication with IVR 10, and proceeds to a general greeting at step 26. The general greeting identifies the purpose of the automated voice and touch-tone service as providing information in response to caller requests and instructs the caller how to make an opening statement regarding the purpose of the call or to wait for a list of menu items. For instance, the general greeting explains that the caller has the option of relying on voice recognition or touch-tone inputs to navigate the menu by stating an utterance or inputting a DTMF tone at any time.

After the greeting, the process proceeds to step 28 where the caller is instructed to "Please identify your task," followed by a pause to allow an opening statement utterance. IVR 10 then lists the menu options and an associated DTMF tone in a predetermined order, such as in the order of frequency of the requests by callers. For instance, an example script read by IVR 10 at step 28 is:

"Please identify your task."
"One. How to use a service."
"Two. Sales information about a service."
"Three. What services do I currently have."
"Four. How much does a service cost."
"Five. Get information about one of my services."
"Six. Who is my long distance carrier."

The order for the list of menu options corresponds to the frequency with which requests for each type of information are made as determined by task analyzer 20. The caller may select a type of information by an appropriate utterance or by inputting a DTMF tone.

At step 30, IVR 10 accepts the caller input, determines the menu node selected by the caller input and advances the input to task analyzer 20 for classification of the task requested by the caller. Analysis of user tasks is thus updated to maintain a current list of frequently requested tasks. For instance, automated analysis may be performed to determine caller tasks and associated utterances or, alternatively, opening statements may be recorded for later play back and analysis. Frequent analysis allows prompt and efficient updates to menu 18 to improve response times and flows for caller requests for information by allowing adjustments to menu 18 in a timely manner. For instance, if a network problem arises which causes a surge in caller requests for post-purchase information, such as a surge in requests for Internet service status when the network has difficulty, task analyzer 20 provides notification through menu GUI 22 so that menu 18 is updated to an order corresponding with the increased frequency of requests for post-purchase information. Thus, callers are presented with the option to request post-purchase information more quickly, reducing the time needed by callers to accomplish a task. This reduces caller frustration for the most frequent call information classifications and also reduces the resource demands on the call center equipment, such as voice recognition and text to speech processors, thereby reducing the overall cost of the application.

IVR 10 determines the category of the task associated with the caller's request for information and forwards the caller to a menu node associated with the task. For instance, at step 34 the caller is advanced to a menu node for information on how to use a service with either an appropriate utterance or the selection of DTMF tone 1. Examples of utterances that result in advancing to a menu node on how to use a service are: "How do I set up a service?" "How do I use a service?" and "How does a service work?" Some examples of services include call blocking, Caller ID, message center, call forwarding and long distance. The likelihood of accurate recognition of utterances by IVR 10 is improved by narrowing the glossary of recognized terms while including a variety of terms that may be associated with a user request for information. Thus, for instance, examples of other types of utterances that result in advancing to the "how to use" menu node associated with step 34 include: "Can I?" "What ways can I?" "Why can't I" and "Why has?" In one embodiment, task analyzer 20 tracks terms uttered by callers to associate terms with task categories, resulting in more accurate application of voice recognition to determine tasks.

From step 30, IVR 10 advances callers to menu nodes associated with tasks based on either the DTMF tone or utterance input of the user. For instance, at step 36, a caller is advanced to a pre-purchase menu node upon selection of DTMF tone 2 or recognition of an utterance associated with a request for pre-purchase information, such as: "I want a service." "Is a service available?" "Can I get a new service?" "Can you send?" "I did not get information." and "What does a service cover?" At step 38, a caller is advanced to a current services menu node upon selection of DTMF tone 3 or recognition of an utterance associated with a request for information about the caller's current services, such as: "Do I have a service?" or "What services do I have?" At step 40, a caller is advanced to a cost menu node upon selection of DTMF tone 4 or recognition of an utterance associated with a request for information about service costs, such as: "How much does it cost to add a service?" "How much is a service?" and "How much does it cost to get a new service?" At step 42, a caller is advanced to a post-purchase menu node upon selection of a DTMF tone of 5 or recognition of an utterance associated with a request for post-purchase information, such as: "I want to change a service." "Who is my service provider?" "Is my service still the same?" "My service connection is bad." and "Can I password protect my service?" At step 44, a caller is advanced to a long distance menu node upon selection of a DTMF tone of 6 or recognition of an utterance associated with a request for information about a caller's long distance provider, such as: "What long distance company do I have?" or "Why do I have this company as my long distance provider?" If a caller fails to select a recognized DTMF tone or utterance, the process proceeds to step 46 to allow the caller to select interaction with an operator.

Figure 3:
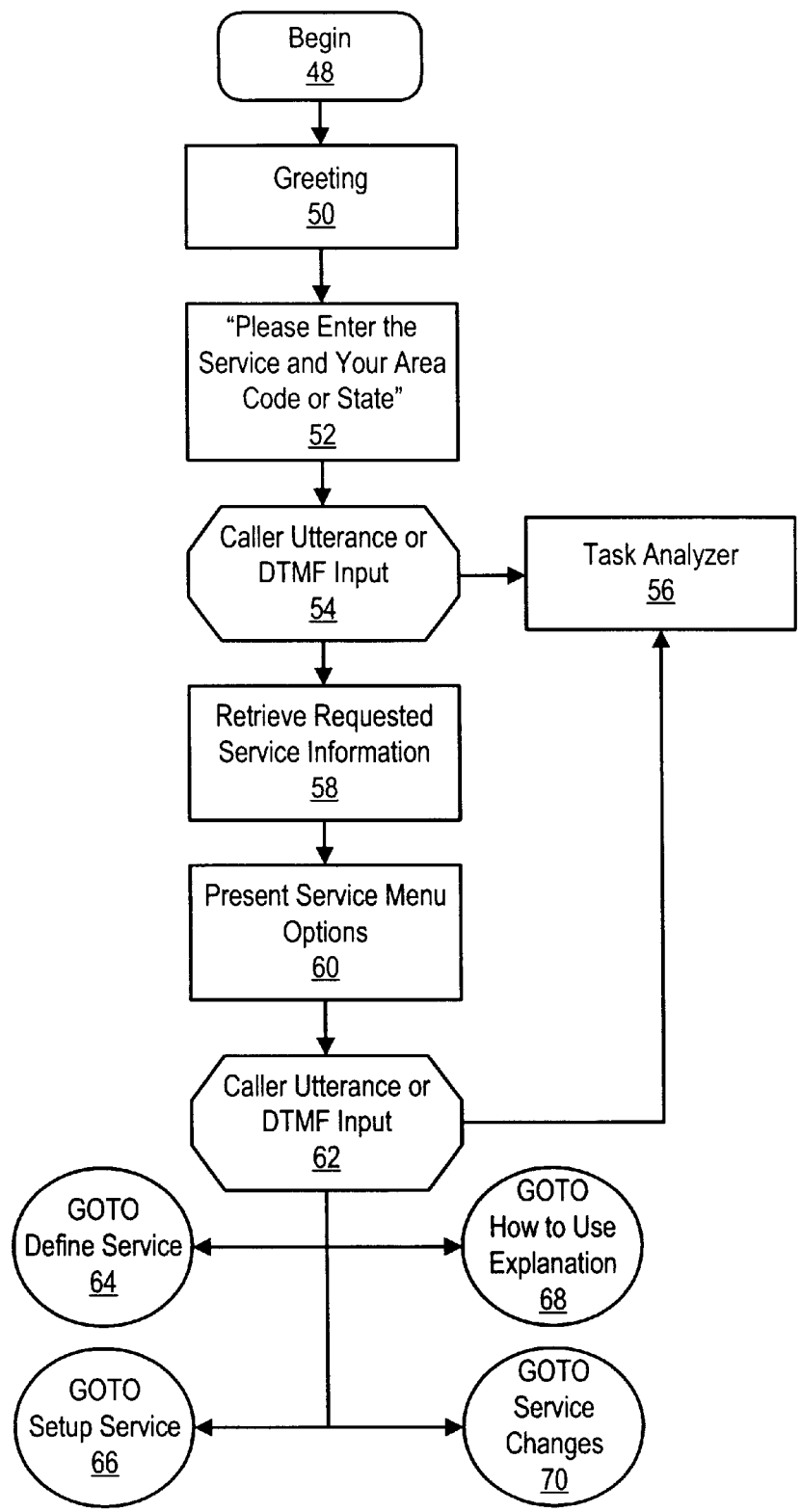
FIG. 3 depicts a flow diagram of a subsequent menu for providing frequently requested information on how to use telephone services.

Referring now to FIG. 3, a flow diagram depicts the process for presenting "how to use" information. A caller request for "how to use" information at step 34 of FIG. 2 initiates the process at step 48 of FIG. 3. At step 50, the caller is provided with a greeting that explains the purpose of the menu node, the services for which information is available, and the availability of either voice recognition or touch-tone inputs for the caller to request information. At step 52, the caller is requested to input the service of interest and the caller's area code or state. For instance, a script instructs the caller to state a service for which information is available, such as call blocking, caller ID, message center and call forwarding, or to input a DTMF tone of 1 through 4 with each tone associated with a service. The caller is also instructed to input an area code or state since service offerings may vary by calling area. The area code and state information may be input by a caller utterance or by using the phone keypad.

At step 54, IVR 10 determines the service and service area input by the caller and, at step 56, forwards the input to task analyzer 20. Analysis of caller inputs is useful in several ways. For instance, relating caller inputs at step 54 with opening statements at 30 allows more specific identification of a caller's initial task and the adapting of voice recognition nodes and glossaries so that opening statements have an increased likelihood of resulting in advancement to an appropriate menu node. Analysis of caller inputs at step 56 also aids in tailoring the "how to use" menu node so that callers are advanced to desired information in a rapid and accurate manner. For instance, the glossary for the menu node is adapted to recognize expected terms, thus improving recognition speed and accuracy. In addition, the menu items are arranged in terms of the frequency in which they are chosen, such that the more frequently selected menu items are listed higher on the menu.

At step 58, IVR 10 retrieves the service information available for the area input by the caller. For instance, service offerings and functionality may vary based on service areas. At step 60, a script presents the caller with the types of information available for the selected service and instructs the caller to select desired information by either a voice utterance or DTMF selection. For instance, the caller is presented with four types of information for the identified service. One type of information is a description of service functionality such as the definition of the service and its objectives. Another type of information is set up information, such as instructions for turning the service on and off. Another type of information is usage information, such as instructions on how to use the service. Another type of information is how to change service functions. The script for each service varies dependent upon the type of information available for the service, and includes DTMF inputs as well as voice recognition inputs for the caller to select desired information.

At step 62, the caller inputs a DTMF tone or speech utterance to navigate for the four types of identified information and the caller's input is forwarded to task analyzer 20. For instance, if the caller inputs a DTMF tone of 1 or requests a definition for a service, the process proceeds to step 64 to provide explanations of definitions and functions for the identified service. If a caller selects a DTMF tone of 2 or requests instructions for set up of a service, the process proceeds to step 66 for instructions on the set up of the identified service. If a caller selects a DTMF tone of 3 or requests instructions for how to use the identified service, the process proceeds to step 68 for an explanation of how to use the service. If a caller selects a DTMF tone of 4 or requests changes to the settings of an identified service, the process proceeds to step 70 for instructions to perform the requested change.

Figure 4:
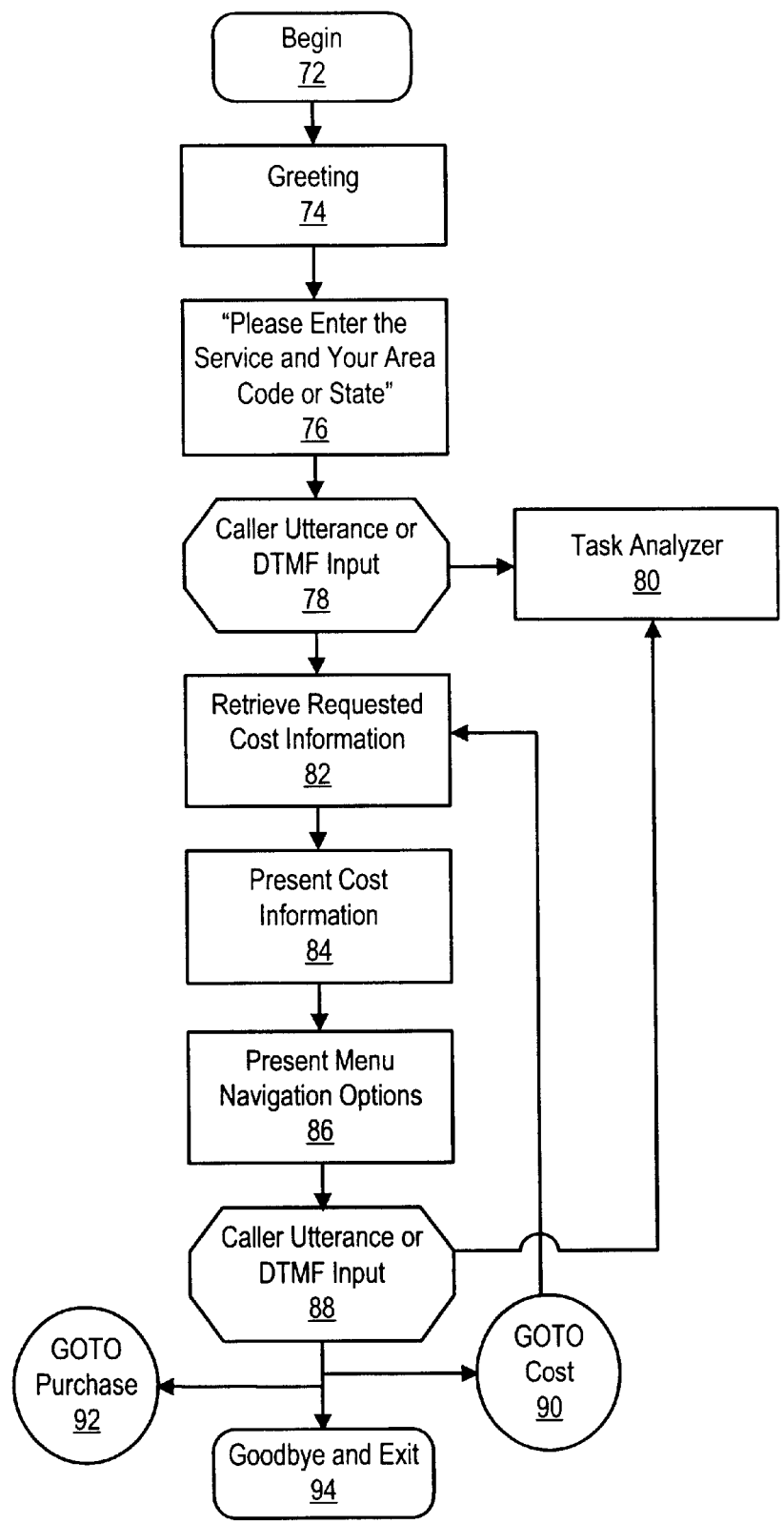
FIG. 4 depicts a flow diagram of a subsequent menu for providing frequently requested information on the cost of telephone services.

Referring now to FIG. 4, a flow diagram depicts the process for providing cost information for identified services. The process begins at step 72 with the identification of a request for cost information at step 40 of FIG. 2. The process proceeds through a greeting at step 74 with an explanation of the information available at the node through the selection of either a DTMF tone or voice utterance. At step 76, the caller is requested to input the service for which cost information is sought and the area code or state of the caller. For instance, frequent requests for cost information include requests for information on the cost of a second telephone line, caller ID, or other new services that are listed along with DTMF tone selection options.

At step 78, the caller identifies the service of interest with a DTMF tone or utterance to IVR 10, which forwards the selection to task analyzer 20 at step 80 as previously described. At step 82, the cost information for the identified service or package of services is retrieved for the identified state or area code and, at step 84 presented to the caller. Although the initial task of the caller was to obtain cost information, such requests for cost information are often followed by requests to learn more about or purchase identified services. At step 86, the caller is presented with options to find the cost of another service, purchase the identified service of terminate the call. At step 88, the caller inputs a DTMF tone or utterance, which is forward to task analyzer 20. If the caller selects a DTMF tone of 1 or states a request for cost information of another service, the process proceeds to step 90 and returns to step 82 to allow the user to select another service. If the caller selects a DTMF tone of 2 or states a request for purchase information, the process proceeds to step 92 to advance the caller to a menu node of service purchase. If the caller selects a DTMF tone of 3 or requests termination of the call, the process proceeds to step 94 at which the call is terminated.

Figure 5:
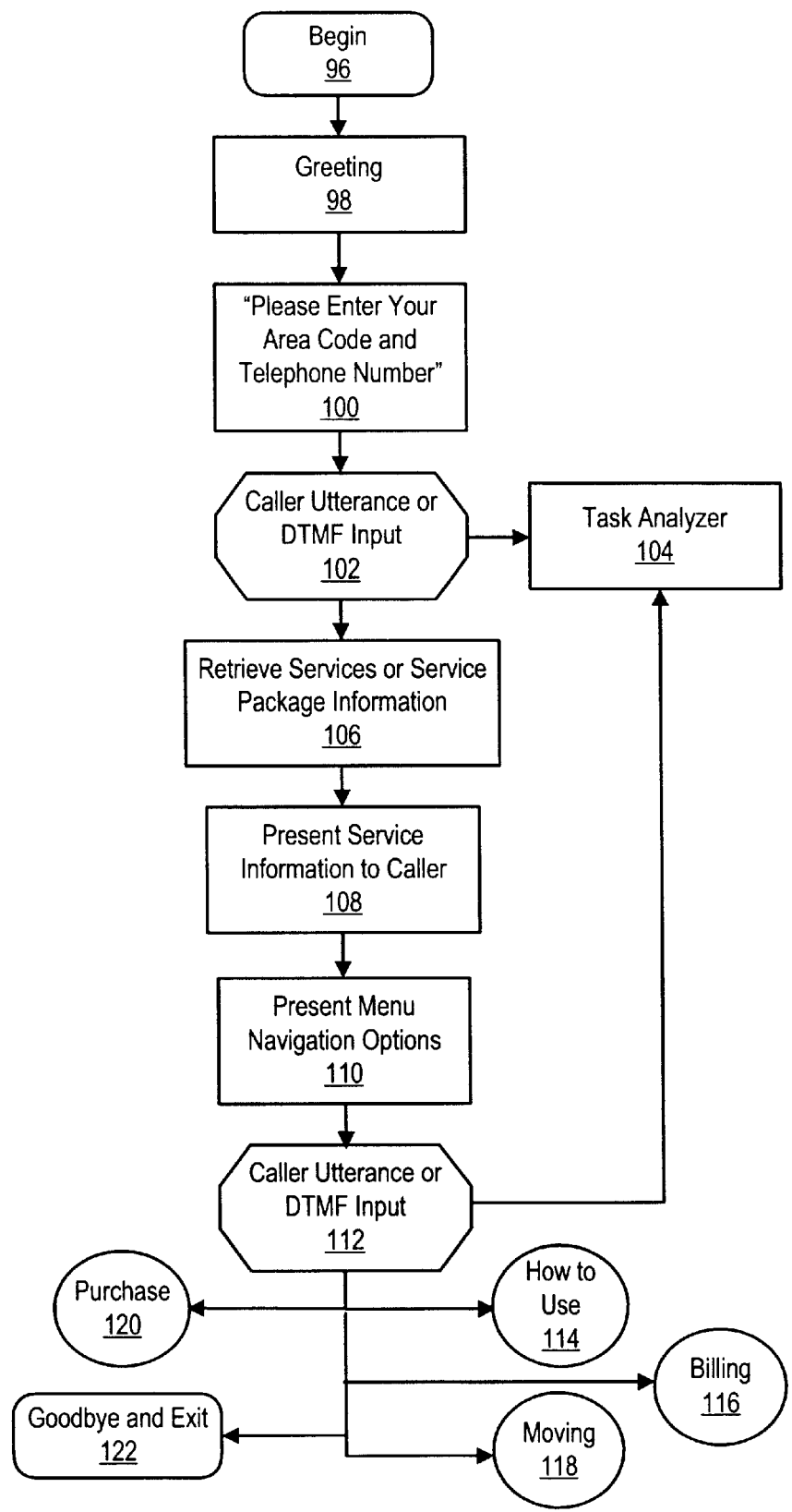
FIG. 5 depicts a flow diagram of a subsequent menu for providing frequently requested information on services subscribed by a caller.

Referring now to FIG. 5, a flow diagram depicts the process for providing "what service do I have" information for a caller. The process begins at step 96, such as from a request for such information at step 38 of FIG. 2. At step 98, the caller is provided a greeting that explains the purpose of the menu node and the availability of DTMF or voice utterance selection. At step 100, the caller is requested to provide the area code and telephone number to identify the services. At step 102, the caller inputs the area code and telephone number, either with an utterance or DTMF tones, and the input is provided to task analyzer 20 at step 104. At step 106, the requested information is retrieved and, at step 108, the caller is presented with a list of service names that are provided to the identified phone number.

When a caller requests information regarding existing services, requests related to the existing services frequently follow. At step 110, the caller is presented with menu options that address information requests or tasks that frequently follow requests for information on existing services. For instance, the caller is presented with options to select DTMF tones or state utterances to obtain instructions for use of services, billing costs or questions, handling moves by the caller, purchase of other services or terminating the call. At step 112, the caller inputs a DTMF tone or statement to accomplish a desired task, and the caller's input is forwarded to task analyzer 20. If the caller requests information on how to use a service, at step 114 the caller is advanced to a "how to use" menu node, such as at steps 48 or 68 of FIG. 3. If the caller requests information on billing or costs, at step 116, the caller is advanced to a menu node that provides billing or cost information. If the caller requests information on handling a move, then at step 118 the caller is advanced to a menu node that provides information on moving telephone service and change of address. If the caller requests information on purchasing additional services, then at step 120 the caller is advanced to a menu node to allow service purchase. If the caller requests termination of the call, then at step 122, the caller is advanced to a menu node for call termination.

Figure 6:
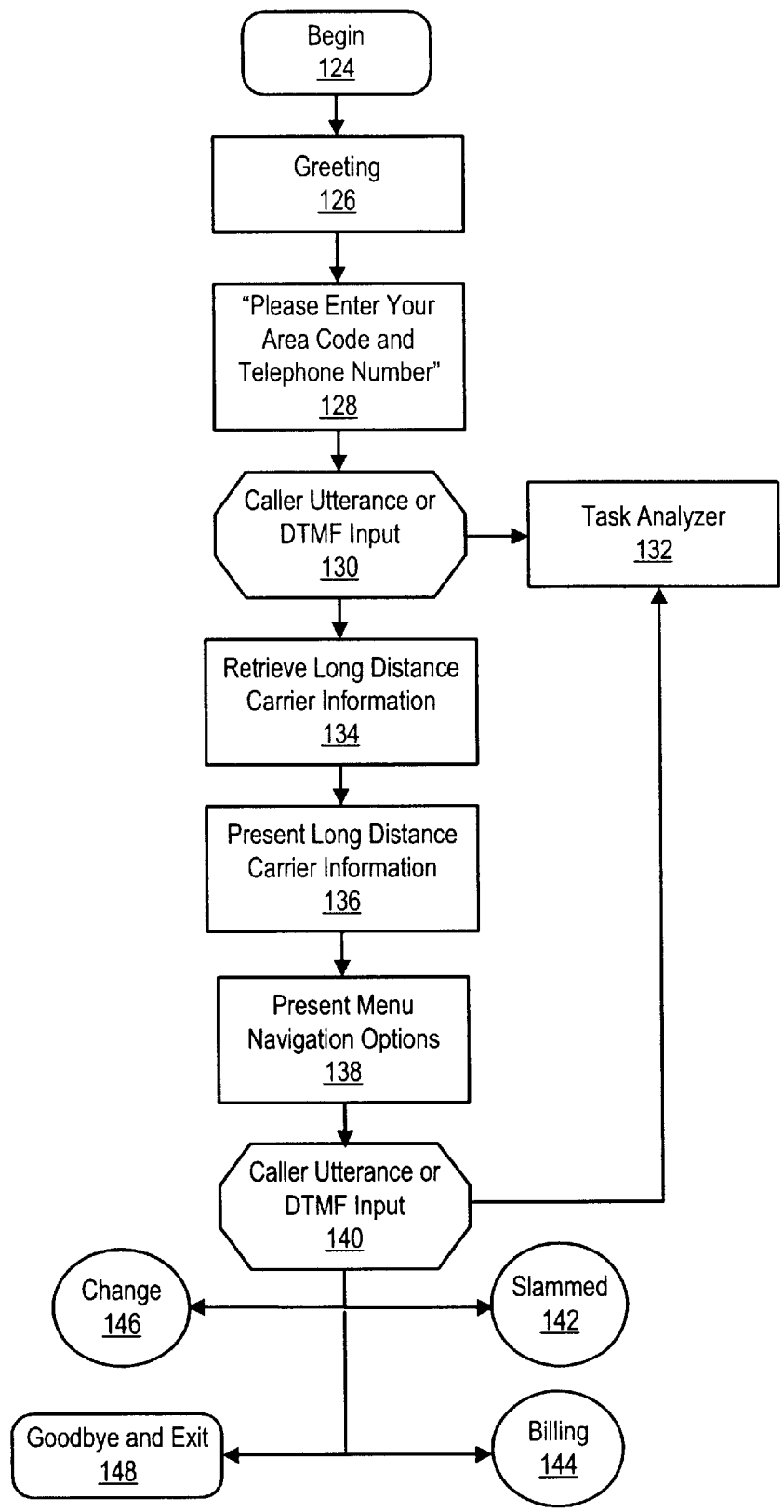
FIG. 6 depicts a flow diagram of a subsequent menu for providing frequently requested information on a caller's long distance carrier.

Referring now to FIG. 6, a flow diagram depicts the process for providing identification of long distance provider information. The process begins at step 124, such as from a caller request for long distance provider information at step 44 of FIG. 2, and proceeds to step 126 at which the caller is greeted with an explanation of the menu node. At step 128, the caller is requested to provide the area code and telephone number either with DTMF tones or voice utterances and, at step 132 the caller input is provided to task analyzer 20. At step 134, the long distance carrier information for the input area code and telephone number are retrieved and, at step 136, the long distance carrier information is provided to the caller.

Requests by callers for long distance carrier information frequently result in additional requests for related information, such as reporting of "slam" changes, billing inquiries, and requests to change the long distance carrier. At step 138, the caller is presented with menu options for requests related to long distance carrier information, including DTMF tone or voice utterance input options. At step 140, the caller inputs a selection which is forwarded to task analyzer 20. If the caller requests to report a slamming event, then at step 142 the caller is advanced to a menu node for reporting slamming complaints. If the caller requests billing or cost information, then at step 144 the caller is advanced to a menu node for providing cost or billing information. If the caller requests a change to the long distance provider, then at step 146 the caller is advanced to a menu node for changing the long distance provider. If the caller requests to terminate the call, then at step 148 the caller is advanced to a menu node for terminating the call.

Figure 7:
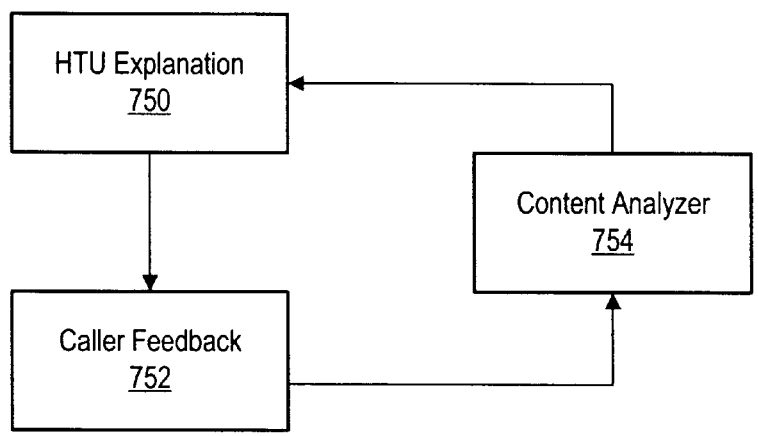
FIG. 7 depicts a flow diagram for updating menu content with caller feedback.

Referring now to FIG. 7, a flow diagram depicts one embodiment for updating menu content with caller feedback. The process begins at step 750, such as upon the completion by a caller of retrieval of How To Use at step 68 of FIG. 3. At step 752, the caller is asked to provide feedback, such as comments about the quality, validity and usefulness of the information provided. A content analyzer 754 receives, records and analyzes the feedback. For instance, content analyzer 754 may record caller comments for playback by system administrators, or may evaluate comments based on speech recognition, resulting in updates to the content of the associated menu node.

Although the present invention has been described in detail, it should be understood that various changes, substitutions and alterations can be made hereto without departing from the spirit and scope of the invention as defined by the appended claims.

What is claimed is:

1. A method for automated speech-enabled responses to information requests made through a telephone network, the method comprising:

analyzing plural opening statements made by callers to classify the information request associated with each opening statement;

determining the frequency of requests for each information request classification;

identifying information request classifications having a predetermined frequency level; and defining an opening menu to respond to caller information requests, the opening menu listing the identified information request classifications and a DTMF tone associated with each information request classification, each information request classification selectable by stating a voice utterance or inputting the associated DTMF tone.

2. The method of claim 1 wherein analyzing plural opening statements further comprises analyzing subsequent menu selections associated with each opening statement to classify the information request associated with the opening statement.

3. The method of claim 1 wherein the information request classifications comprise telephone service information.

4. The method of claim 3 wherein the opening menu comprises selections for how to use a service, pre-purchase information, identification of caller services, cost of services, post-purchase information and identification of caller long distance service carrier.

5. The method of claim 1 further comprising:

analyzing subsequent caller requests for information to classify the subsequent information requests associated with one or more of the opening menu information request classifications;

determining the frequency of the subsequent information request classifications; and defining a subsequent menu listing to respond to caller requests for information, the subsequent menu listing having the subsequent information request classifications and a DTMF tone associated with each subsequent information request classification.

6. The system of claim 5 wherein the subsequent menu listing provides the subsequent information request classifications in order from most to least frequent.

7. The system of claim 1 wherein the opening menu lists the identified information request classifications in order from most to least frequent.

8. The system of claim 1 further comprising re-defining the menu to adjust for changes in frequency of information requests for a classification.

9. The system of claim 1 wherein defining an opening menu comprises listing the information request classifications in the opening menu in an order based on information request frequency.

10. A system for providing information to callers over a telephone, the system comprising:

an interactive voice response unit operable to provide voice prompts to callers and to accept caller inputs as either voice utterances or DTMF tones;

a menu interfaced with the interactive voice response unit, the menu defining prompts to callers for information, the prompts based on information request frequency; and a task analyzer interfaced with the interactive voice response unit and operable to classify caller opening statements by the information requested and to track information request frequency.

11. The system of claim 10 further comprising a menu graphical user interface in communication with the task analyzer and the menu for ordering the prompts in accordance with the information request frequency.

12. The system of claim 11 wherein the menu prompts are ordered from greatest to least frequent information request.

13. The system of claim 10 wherein the task analyzer is further operable to analyze subsequent caller requests for information to classify the subsequent information requests associated with one or more of the opening statement information request classifications.

14. The system of claim 10 wherein the menu defines prompts to request information about telephone services.

15. The system of claim 14 wherein the telephone service information comprises information describing how to use a telephone service, describing telephone pre-purchase information, identifying the telephone services subscribed by the caller, describing the cost of telephone services, describing post-purchase information and identifying the long distance carrier of the caller.

16. The system of claim 15 wherein selection of a menu option for information describing how to use a telephone service provides a subsequent menu for selection of a definition of the telephone service, an explanation of how to use the telephone service, an explanation of how to set up the telephone service and the cost of the telephone service.

17. A menu for a voice recognition enabled interactive voice response unit for providing information to callers, the menu comprising:

a voice greeting that describes the menu as responsive to both voice recognition and DTMF tone caller inputs;

an opening statement voice prompt that requests a caller statement identifying information requested by the caller; and plural menu option voice prompts, each menu option voice prompt requesting a caller statement or a DTMF tone for the caller to receive information associated with the voice prompt;

wherein the plural menu option voice prompts list information determined by an analysis of the frequency of information requested by caller opening statements.

18. The menu of claim 17 wherein the information comprises information about telephone services.

19. The menu of claim 18 wherein the plural menu option voice prompts comprise prompts for information describing how to use a telephone service, describing telephone pre-purchase information, identifying the telephone services subscribed by the caller, describing the cost of telephone services, describing post-purchase information and identifying the long distance carrier of the caller.

20. The menu of claim 17 wherein the plural menu option voice prompts list information ordered from most frequently requested to least frequently requested.

21. A method for automated speech-enabled responses to information requests made through a telephone network, the method comprising:

analyzing plural opening statements made by callers to classify the information request associated with each opening statement;

determining the frequency of requests for each information request classification;

monitoring a feedback frequency of receiving feedback from callers, wherein the feedback relates to speech-enabled response content;

automatically modifying the speech-enabled response content, based on the feedback frequency.

* * * * *